US009746601B2

United States Patent
Huang et al.

(10) Patent No.: US 9,746,601 B2
(45) Date of Patent: Aug. 29, 2017

(54) LIGHT GUIDE PLATE AND ASSEMBLY MODULE USING THE SAME AND BACKLIGHT MODULE

(71) Applicant: HON HAI PRECISION INDUSTRY CO., LTD., New Taipei (TW)

(72) Inventors: Gwo-Yan Huang, New Taipei (TW); Chien-Hsiang Lin, New Taipei (TW); Mi-Chien Chen, New Taipei (TW); Mu-Chi Hsu, New Taipei (TW); Yan-Hao Lin, New Taipei (TW); Chien-Liang Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 241 days.

(21) Appl. No.: 14/682,120

(22) Filed: Apr. 9, 2015

(65) Prior Publication Data
US 2015/0293291 A1 Oct. 15, 2015

(30) Foreign Application Priority Data
Apr. 10, 2014 (TW) .............................. 103113158 A

(51) Int. Cl.
*F21V 8/00* (2006.01)
(52) U.S. Cl.
CPC ............ *G02B 6/008* (2013.01); *G02B 6/0031* (2013.01); *G02B 6/0046* (2013.01)
(58) Field of Classification Search
CPC .. G02B 6/0048; G02B 6/0046; G02B 6/0076; G02B 6/008; G02B 6/0045
See application file for complete search history.

(56) References Cited

U.S. PATENT DOCUMENTS

| | | | | |
|---|---|---|---|---|
| 6,241,358 B1 * | 6/2001 | Higuchi | ................. | G02B 6/008 362/23.15 |
| 8,092,064 B2 * | 1/2012 | Erchak | ................. | G02B 6/0085 349/65 |
| 8,684,588 B2 * | 4/2014 | Ajichi | ................. | G02B 6/0036 362/23.09 |
| 8,690,414 B2 | 4/2014 | Tomotoshi et al. | | |
| 2006/0221638 A1 | 10/2006 | Chew et al. | | |

(Continued)

FOREIGN PATENT DOCUMENTS

| | | |
|---|---|---|
| EP | 2400479 A1 | 12/2011 |
| TW | 200636347 A | 10/2006 |
| TW | I392926 B1 | 4/2013 |

*Primary Examiner* — Karabi Guharay
(74) *Attorney, Agent, or Firm* — Steven Reiss

(57) ABSTRACT

A light guide plate includes a light incident section and a light guiding section. The light incident section includes a light incident surface configured to receive light beams emitted from a light source, a top surface adjacent to the light incident surface, a first bottom surface oppose to the top surface. The light guiding section includes a main light emitting surface, a connecting surface connecting the main light emitting surface with the top surface, a second bottom surface opposite to the main light emitting surface and connecting with the first bottom surface, and a contacting surface connecting with the main light emitting surface and the second bottom surface. A step is formed at a junction of the light incident section and the light guiding section, and the connecting surface and the top surface define an accommodating space.

12 Claims, 13 Drawing Sheets

(56) References Cited

U.S. PATENT DOCUMENTS

2010/0182767 A1     7/2010   Chen et al.
2012/0287668 A1*   11/2012   Richardson ............. F21V 29/00
                                                                                     362/602

* cited by examiner

LIGHT GUIDE PLATE AND ASSEMBLY MODULE USING THE SAME AND BACKLIGHT MODULE

CROSS-REFERENCE TO RELATED APPLICATIONS

This application claims all benefits accruing under 35 U.S.C. §119 from Taiwanese Patent Application No. 103, 113,158, filed on Apr. 10, 2013 in the Taiwanese Intellectual Property Office, the content of which is hereby incorporated by reference.

FIELD

The subject matter herein generally relates to a light guide plate piece and an assembly module using the same to form a light guide plate, which is typically used in display device, such as a liquid crystal display device.

BACKGROUND

A backlight source or a backlight module of a display device usually employs a light guide plate for providing a planar light source. Size of the light guide plate needs to be fit for the size of the display device. However, it is difficult for a large-sized light guide plate to emit enough uniform light beams. Moreover, for an edge-emitted light guide plate, an optical length of light emitted into the large-sized light guide plate obviously increases, which results in loss of light energy. In addition, the fabrication and transporting difficulty also increases with the increase of the size of the light guide plate.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Figure 1:
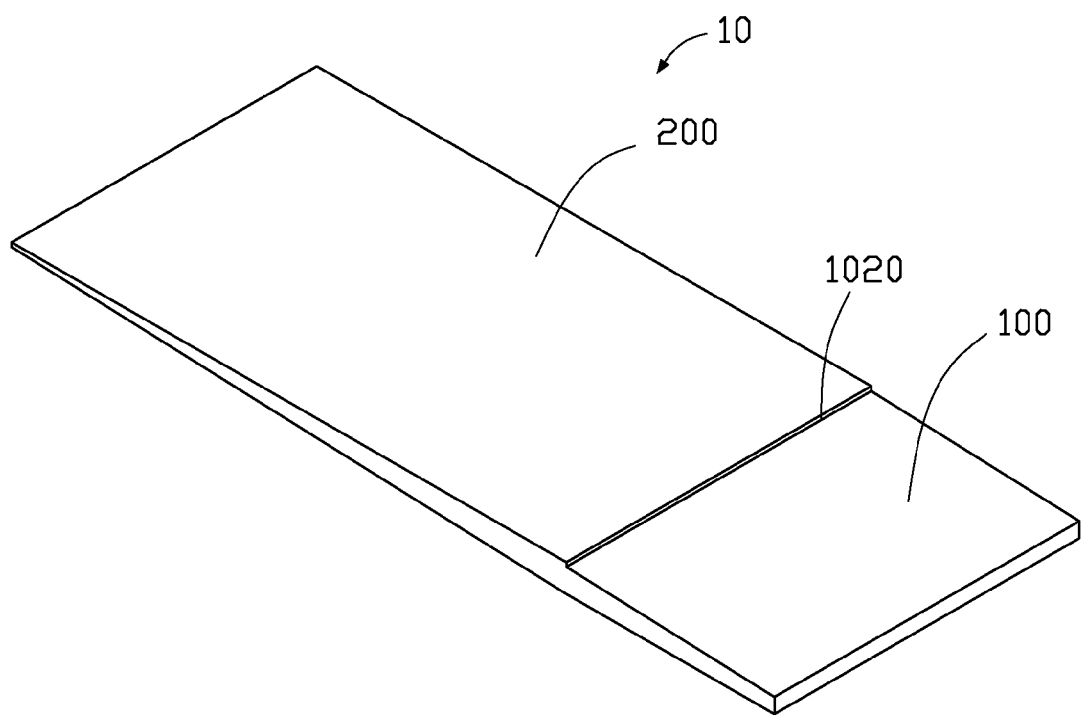
FIG. 1 is a diagrammatic view of a light guide plate piece of a light guide plate according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Referring to FIG. 1, a diagrammatic view of a light guide plate piece 10 of a light guide plate according to one embodiment of the present disclosure is shown. The light guide plate piece 10 can be used as a single light guide plate to provide planar light beams to a display device and includes a light incident section 100 and a light guiding section 200. The light incident section 100 is configured to receive light beams from a light source (not shown) and transmit the light beams to the light guiding section 200. The light guiding section 200 is configured to guide and emit the light beams out of the light guiding section 200. The light incident section 100 and the light guiding section 200 are integrated as a whole. A step 1020 is formed at a junction of the light incident section 100 and the light guiding section 200, thereby forming an accommodating space to receive another light guide plate piece 10. In the embodiment, the light guide plate piece 10 is made from transparent material, which includes, but is not limited to: glass, acrylic (e.g., polymethylmethacrylate (PMMA)) and polycarbonate.

Figure 2:
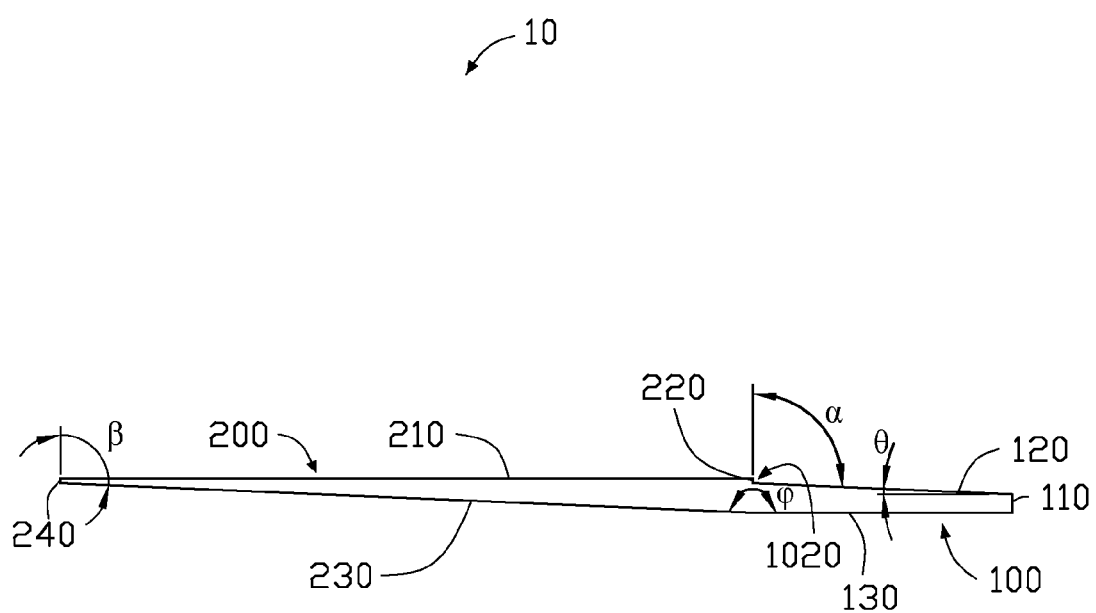
FIG. 2 is a cross-sectional view of the light guide plate piece of FIG. 1.

FIG. 2 is a cross-sectional view of the light guide plate piece 10. The light incident section 100 includes a light incident surface 110, a top surface 120 and a first bottom surface 130. The top surface 120 is opposite to the first bottom surface 130 and connects to the light incident surface 110. The light incident surface 110 is adjacent to a light source (shown in FIGS. 3-4) and is configured to receive the light beams emitted from the light source. In the embodiment, the light incident surface 110, the top surface 120 and the first bottom surface 130 are flat surfaces. A first angel θ defined by the top surface 120 and the first bottom surface 130 is ranged from 0° to 15°. The first bottom surface 130 is perpendicular to the light incident surface 110 and is configured to corporate with a holding element (not shown) to support the light guide plate piece 10.

The light guiding section 200 includes a main light emitting surface 210, a connecting surface 220 connecting the main light emitting surface 210 with the top surface 120, a second bottom surface 230 opposite to the main light emitting surface 210 and connecting with the first bottom surface 130, and a contacting surface 240 connecting the main light emitting surface 210 with the second bottom surface 230. The main light emitting surface 210, the connecting surface 220, the second bottom surface 230 and the contacting surface 240 are flat surfaces. The main light emitting surface 210 is configured to allow the light beams to emit out of the light guide plate piece 10. The connecting surface 220 cooperates with the top surface 120 to define the step 1020. A second angle α defined by the connecting surface 220 and the top surface 120 is greater than 90 degree.

Although the first bottom surface 130 connects with the second bottom surface 230, the second bottom surface 230 and the first bottom surface 130 are not in a same plane, and a third angle φ defined therebetween is an obtuse angle. In the embodiment, the third angle φ is ranged from 165° to 180°. In detail, a distance between the first bottom surface 130 and the top surface 120 gradually increases along a direction away from the light incident surface 110 to the step 1020, which is shaped similar as a wedge-shaped light guide plate to increase the availability of light. At the same time, a distance between the second bottom surface 230 and the light emitting surface 210 gradually decreases along a direction away from the step 1020 to the contacting surface 240, so that a thinner light guide plate 10 can be obtained. In the embodiment, the second bottom surface 230 is parallel to the top surface 120, and the sum of the first angle θ and the second angle α is about 180°. The contacting surface 240 is configured to abut against the connecting surface 220 of another light guide plate piece 10. The contacting surface 240 and the second bottom surface 230 define a fourth angle β. The fourth angle β is substantially equal to the second angle β, and both are greater than 90 degrees.

Alternatively, the second bottom surface 230 can be for example a reflective surface, which is configured to reflect the light beams transmitted to the second bottom surface 230 back to the light guide plate piece 10.

Figure 3:
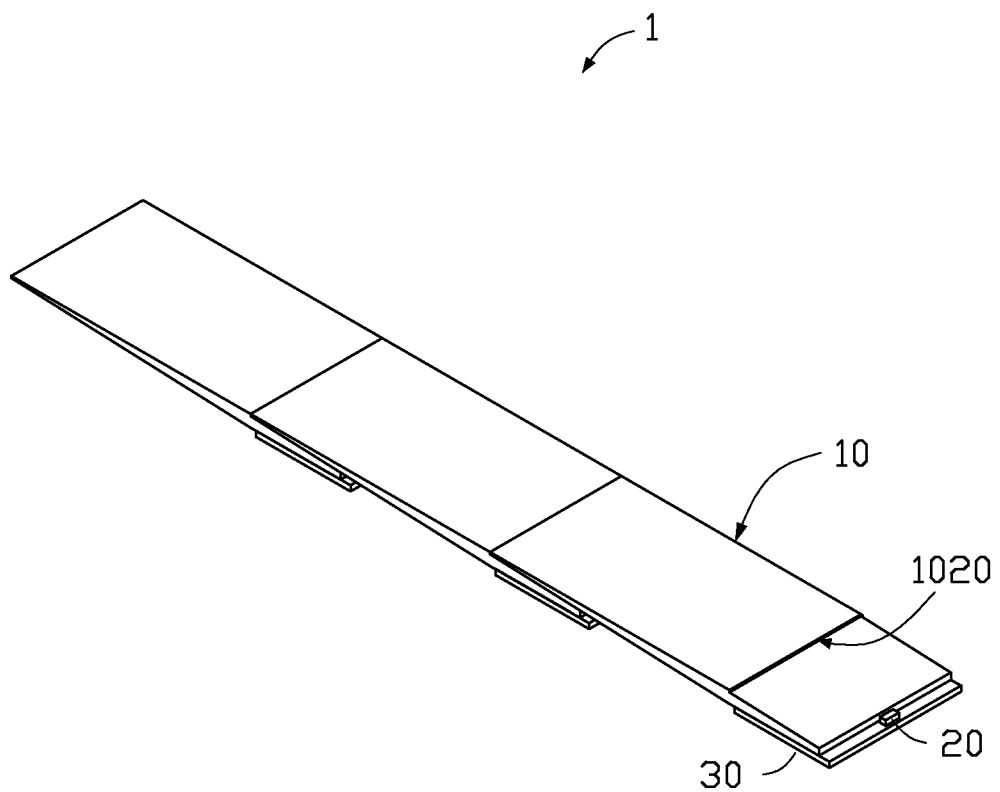
FIG. 3 is a diagrammatic, side view of a backlight module including an assembly module forming by a set of the light guide plate pieces of FIG. 1 and corresponding light sources.
Figure 4:
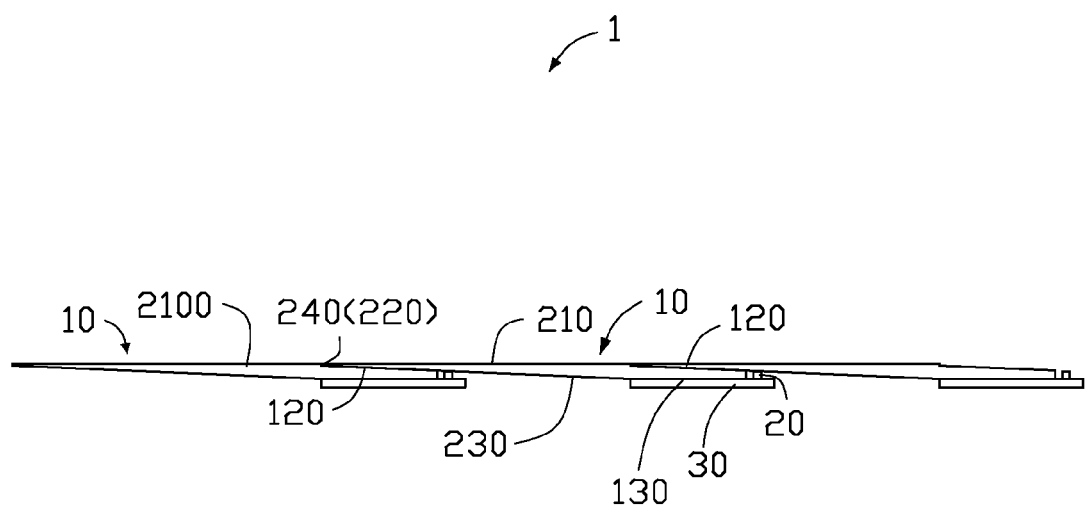
FIG. 4 is a diagrammatic, cross-section of the backlight module of FIG. 3.

Referring to FIGS. 3-4, a backlight module 1 is shown. The backlight module 1 includes an assembly module formed by a plurality of light guide plate pieces 10, a plurality of light sources 20 and a plurality of supporting plates 30. The contacting surface 240 of each light guide plate piece 10 (except the last one) abuts against the step 1020 of a neighboring light guide plate piece 10, and the light guiding section 200 is received into the accommodating space formed by connecting surface 220 and the top surface 120, thereby making the set of the light guide plate pieces connects one by one to form the assembly module. In the embodiment, the assembly module serves as a light guide plate and its size can be regulated according to the number of the light guide plate pieces 10. Moreover, because the second bottom surface 230 is substantially parallel to the top surface 120, when the several light guide plate pieces 10 jointly connects one by one, the light emitting surfaces 210 are located at a same plane to form a complete light emitting surface 2100 of the assembly module.

Each of the light guide plate piece 10 corresponds to one light source 20 and one supporting plate 30. The supporting plate 30 is positioned below the first bottom surface 130 of the light guide plate piece 10, which is configured to support the light guide plate piece 10 and the light source 20. The light source 20 is positioned on the supporting plate 30 and adjacent to the light incident surface 110. In the embodiment, each light incident surface 110 corresponds to at least one light source 20. Alternatively, the light sources 20 can be selectively positioned at a part of the light incident surfaces 110. The light source 20 can be for example a light emitting diode (LED). Because the light source 20 can be arranged at regions away from edges of the assembly module, the assembly module can obtain uniform emitting light, compare to a conventional light guide plate with light sources arranged adjacent to the edges.

Figure 5:
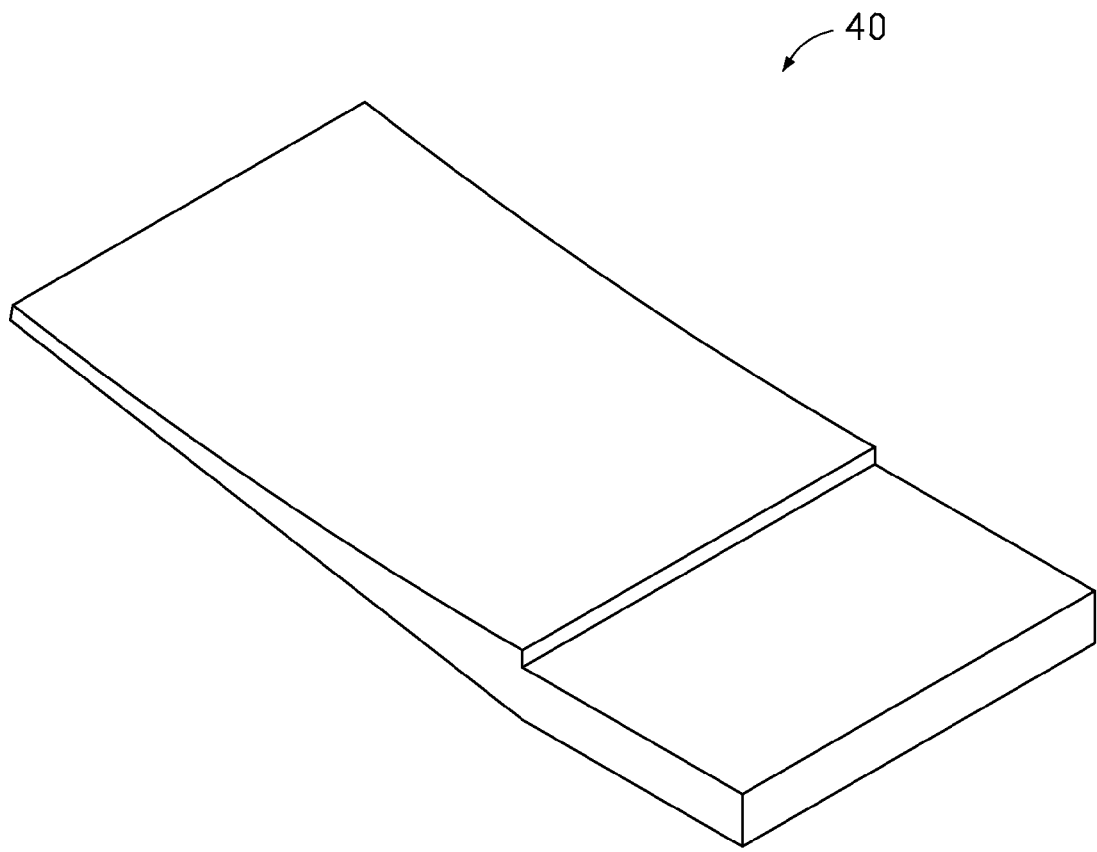
FIG. 5 is diagrammatic, perspective view of a light guiding plate piece according to a second embodiment of the present disclosure.
Figure 6:
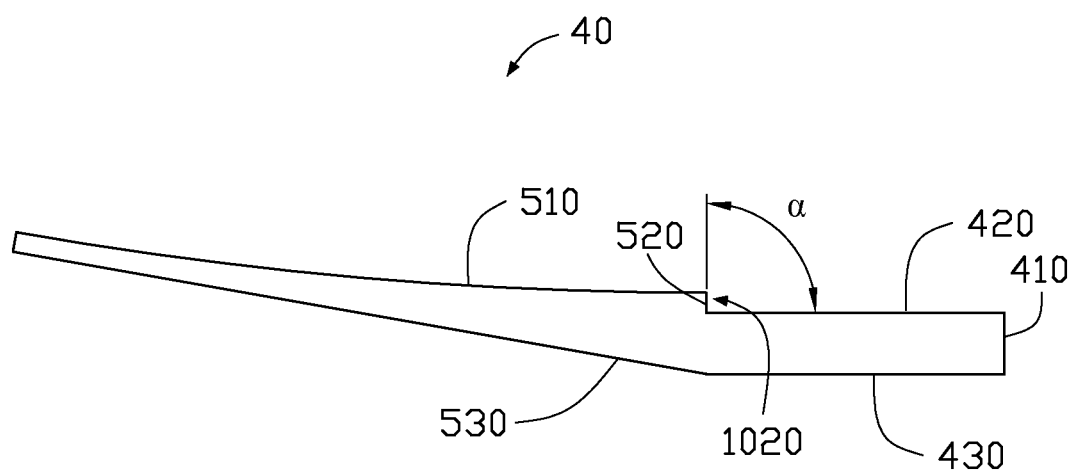
FIG. 6 is diagrammatic, side-view of light guide plate piece of FIG. 5.

Referring to FIGS. 5-6, a light guide plate piece 40 of a light guide plate according to a second embodiment of the present disclosure is shown. The light guide plate piece 40 is similar to the light guide plate piece 10 of the first embodiment. However, the difference is that a main light emitting surface 510 of the light guide plate piece 40 is a curved surface. In the embodiment, the curved surface is a concave surface towards to a second bottom surface 530 of the light guide plate piece 40. At the same time, the second angle α defined by the connecting surface 520 and the top surface 420 is equal to 90 degree. In detail, a distance between the first bottom surface 430 and the top surface 420 gradually is identical along a direction away from the light incident surface 410 to the step 1020, which is shaped similar as a rectangular light guide plate. So that a thinner light guide plate piece 40 can be obtained.

Figure 7:
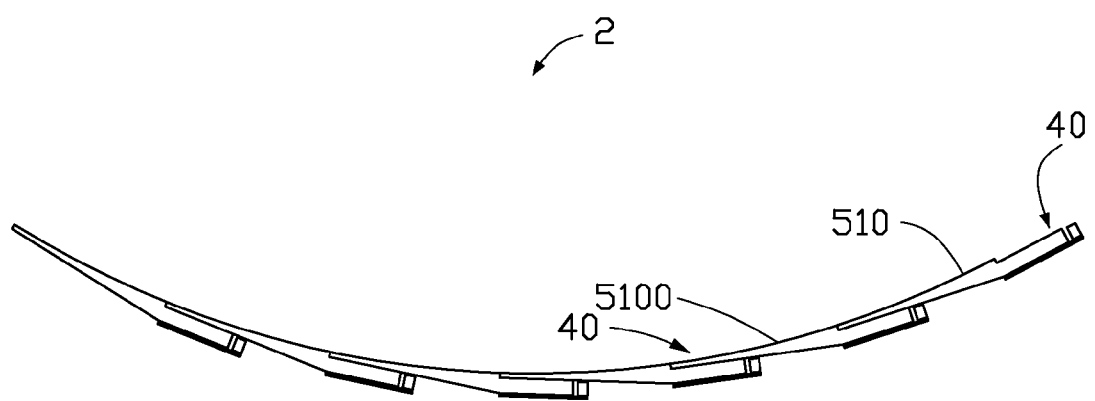
FIG. 7 is diagrammatic, side-view of a backlight module including an assembly module formed by a set of light guiding plate pieces of FIG. 5 and corresponding light sources.

Accordingly, referring to FIG. 7, a backlight module 2 employing a set of the light guide plate pieces 40 is also similar to the backlight module 1 as described above. However, an assembly module formed by the set of the light guide plate pieces 40 jointly connected one by one has a complete curved light emitting surface 5100. Each light emitting surface 510 of the light guide plate pieces 40 is one portion of the complete curved light emitting surface 5100. The assembly module can serve as a curved light guide plate and is used into a curved display device.

Figure 8:
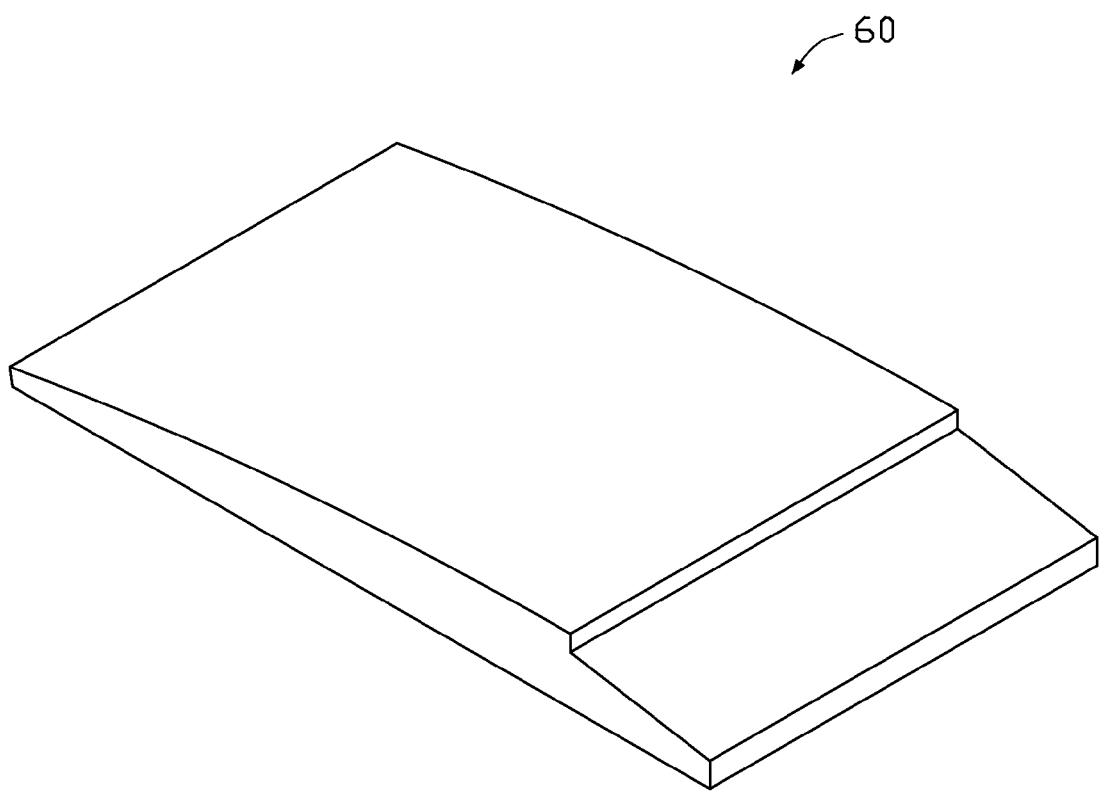
FIG. 8 is diagrammatic, perspective view of a light guide plate piece of a light guide plate according to a third embodiment of the present disclosure.
Figure 9:
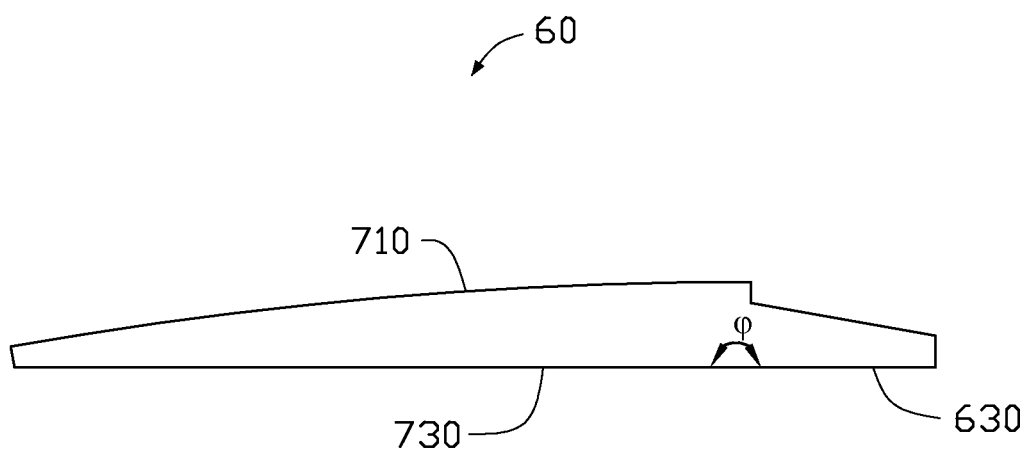
FIG. 9 is diagrammatic, side-view of light guide plate piece of FIG. 8.

Referring to FIGS. 8-9, a light guide plate piece 60 of a light guide plate according to a third embodiment of the present disclosure is shown. The light guide plate piece 60 is similar to the light guide plate piece 10 of the first embodiment. However, the differences include that a main light emitting surface 710 of the light guide plate piece 60 is a curved surface, and a second bottom surface 730 and a first bottom surface 630 are in a same plane, which means a third angle φ defined by the first and second bottom surfaces 630, 730 is about 180 degree. In the embodiment, the curved surface is a convex surface outwards to the second bottom surface 730 of the light guide plate piece 60.

Figure 10:
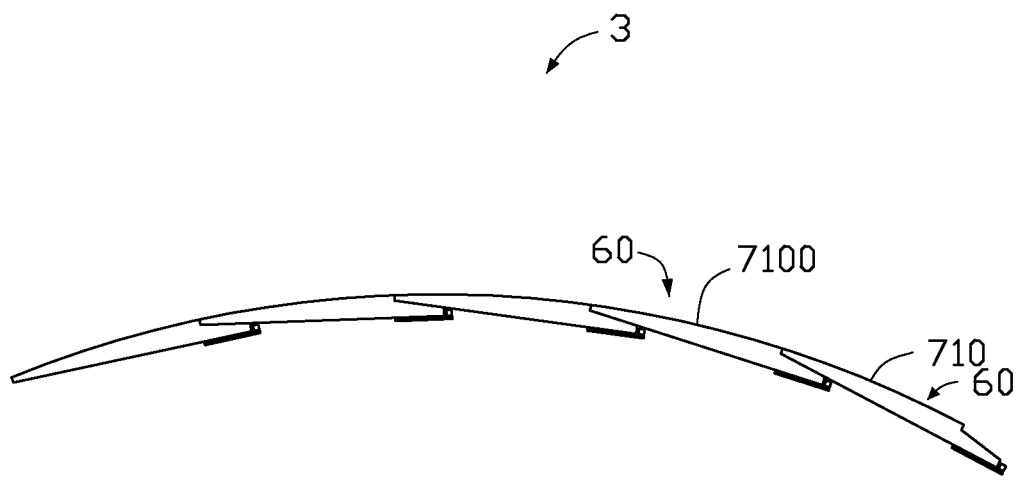
FIG. 10 is a diagrammatic, side-view of a backlight module including an assembly module formed by a set of light guide plate pieces as shown in FIG. 8 and corresponding light sources.

Accordingly, referring to FIG. 10, a backlight module 3 employing a set of the light guide plate pieces 60 is also similar to the backlight module 1 as described above. However, an assembly module formed by the set of the light guide plate pieces 60 jointly connected one by one has a complete curved light emitting surface 7100. Each light emitting surface 710 of the light guide plate pieces 60 is one portion of the complete curved light emitting surface 7100. The assembly module can also serve as a curved light guide plate and is used into a curved display device.

Figure 11:
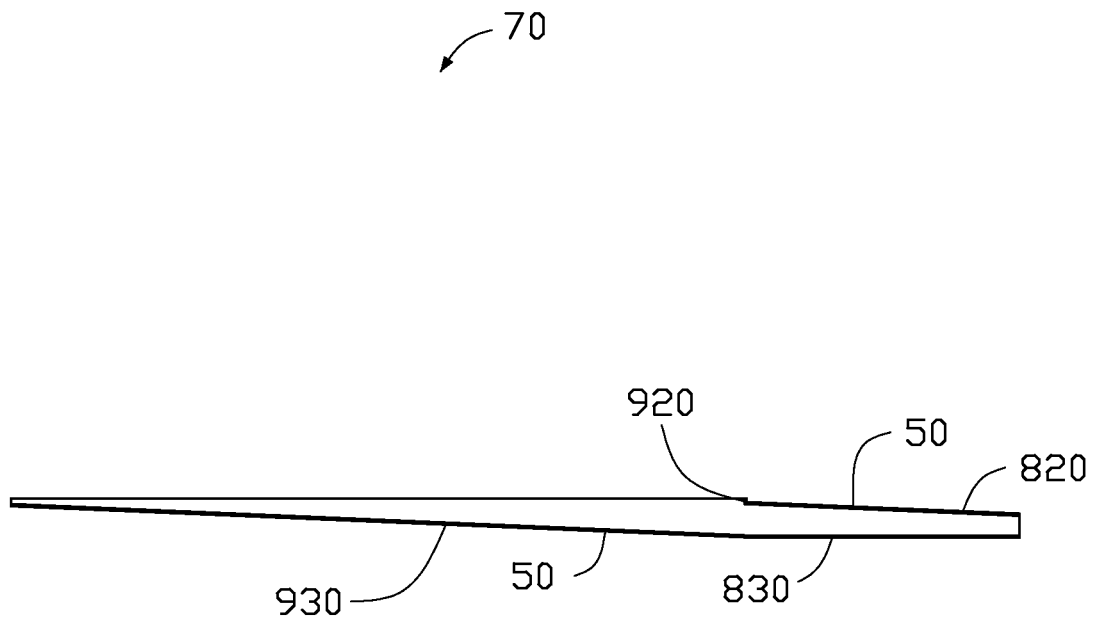
FIG. 11 is a diagrammatic, side view of a light guide plate piece according to an alternative embodiment of the light guide plate piece of FIG. 1.

Referring to FIG. 11, a light guide plate piece 70 of a light guide plate according to a fourth embodiment of the present disclosure is shown. The light guide plate piece 70 is similar to the light guide plate piece 10 of the first embodiment. However, the difference is that a reflective film 50 is positioned on a top surface 820, a first bottom surface 830, a connecting surface 920 and a second bottom surface 930. The reflective film 50 is configured to reflect the light beam back to the light guide plate piece 70.

Figure 12:
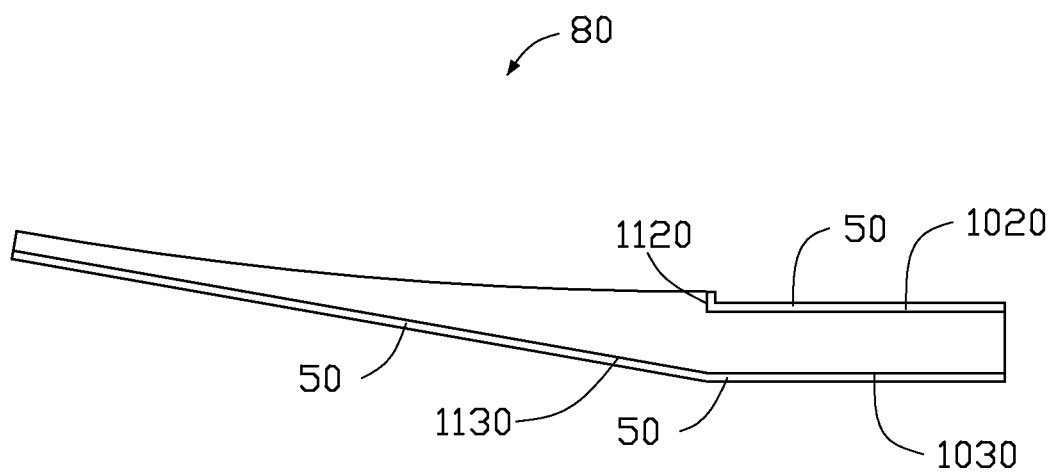
FIG. 12 is diagrammatic, side view of a light guide plate piece according to an alternative embodiment of the light guide plate piece of FIG. 5.

Referring to FIG. 12, a light guide plate piece 80 of a light guide plate according to a five embodiment of the present disclosure is shown. The light guide plate piece 80 is similar to the light guide plate piece 40 of the second embodiment. However, the difference is that a reflective film 50 is positioned on a top surface 1020, a first bottom surface 1030, a connecting surface 1120 and a second bottom surface 1130. The reflective film 50 is configured to reflect the light beam back to the light guide plate piece 80.

Figure 13:
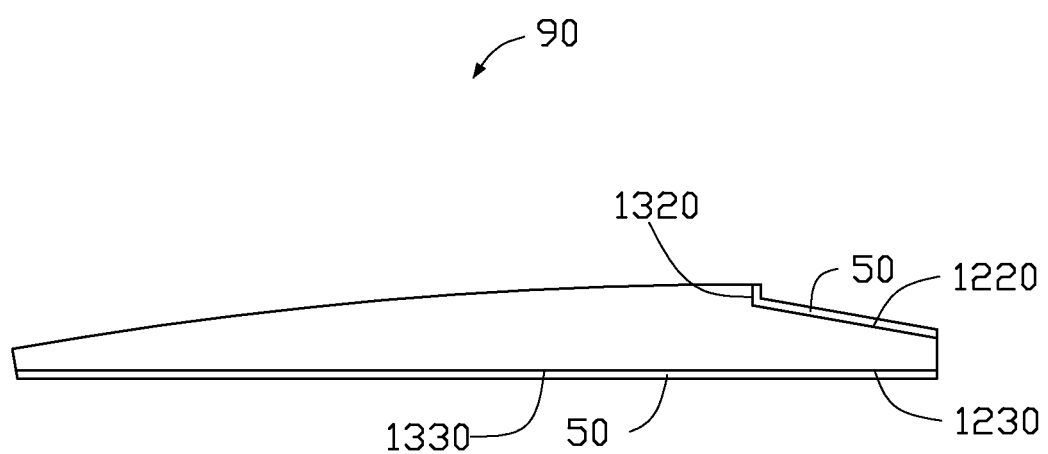
FIG. 13 is diagrammatic, side view of a light guide plate according to an alternative embodiment of the light guide plate piece of FIG. 8.

Referring to FIG. 13, a light guide plate piece 90 of a light guide plate according to a six embodiment of the present disclosure is shown. The light guide plate piece 90 is similar to the light guide plate piece 60 of the third embodiment. However, the difference is that a reflective film 50 is positioned on a top surface 1220, a first bottom surface 1230, a connecting surface 1320 and a second bottom surface 1330. The reflective film 50 is configured to reflect the light beam back to the light guide plate piece 90.

It is to be further understood that even though numerous characteristics and advantages of preferred and exemplary embodiments have been set out in the foregoing description, together with details of the structures and functions of the embodiments, the disclosure is illustrative only; and that changes may be made in detail, especially in the matters of shape, size and arrangement of parts within the principles of the present disclosure to the full extent indicated by the broad general meaning of the terms in which the appended claims are expressed.

What is claimed is:

1. A light guide plate comprising:
a light incident section comprising:
a light incident surface configured to receive light beams emitted from a light source;
a top surface adjacent to the light incident surface; and
a first bottom surface opposite to the top surface;
a light guiding section comprising:
a main light emitting surface;
a connecting surface connecting the main light emitting surface with the top surface of the light incident section;
a second bottom surface opposite to the main light emitting surface and connected with the first bottom surface of the light incident section; and
a contacting surface connecting the main light emitting surface of the light guide section with the second bottom surface thereof;
wherein the first bottom surface is perpendicular to the light incident surface, the first bottom surface and the second bottom surface are flat, the second bottom surface and the first bottom surface are not in a same plane, and an angle defined between the first bottom surface and the second bottom surface is an obtuse angle; and
wherein a step is formed at a junction of the light incident section and the light guiding section, and the connecting surface of the light guiding section and the top surface of the light incident section define an accommodating space.

2. The light guide plate of claim 1, wherein the main light emitting surface is a flat surface and parallel to the first bottom surface.

3. The light guide plate of claim 1, wherein the main light emitting surface is a curve surface.

4. The light guide plate of claim 3, wherein the main light emitting surface is a concave surface towards to the second bottom surface.

5. The light guide plate of claim 1, wherein a reflective film is positioned on the connecting surface, the top surface, the first bottom surface and the second bottom surface.

6. An assembly module of light guide plate, comprising:
a plurality of light guide plate pieces jointly connecting one by one, each of the light guide plate pieces comprising:
a light incident section comprising:
a light incident surface configured to receive light beams emitted from a light source;
a top surface adjacent to the light incident surface; and
a first bottom surface opposite to the top surface;
a light guiding section comprising:
a main light emitting surface;
a connecting surface connecting the main light emitting surface with the top surface of the light incident section;
a second bottom surface opposite to the main light emitting surface and connected with the first bottom surface of the light incident section; and
a contacting surface connecting the main light emitting surface of the light guide section with the second bottom surface thereof;
wherein the first bottom surface is perpendicular to the light incident surface, the first bottom surface and the second bottom surface are flat, the second bottom surface and the first bottom surface are not in a same plane, and an angle defined between the first bottom surface and the second bottom surface is an obtuse angle; and
wherein a step is formed at a junction of the light incident section and the light guiding section, and the connecting surface of the light guiding section and the top surface of the light incident section define an accommodating space to receive a neighboring light guide plate piece.

7. The assembly module of light guide plate of claim 6, wherein the contacting surface of the light guide plate piece abuts against the step of the neighboring light guide plate piece, and the light guiding section is received into the accommodating space of the neighboring light guide plate piece.

8. The assembly module of light guide plate of claim 6 wherein the main light emitting surface is a flat surface and parallel to the first bottom surface.

9. The assembly module of light guide plate of claim 6 wherein the main light emitting surface is a curve surface.

10. The assembly module of light guide plate of claim 9, wherein the main light emitting surface is a concave surface towards to the second bottom surface.

11. The assembly module of light guide plate of claim 6, wherein a reflective film is positioned on the connecting surface, the top surface, the first bottom surface and the second bottom surface.

12. A backlight module comprising:
a plurality of light sources configured to emit light beams;
a plurality of light guide plate pieces jointly connecting one by one and corresponding to at least one light source;
a plurality of supporting plates configured to support the plurality of light guide plate pieces and the plurality of light sources, each of the light guide plate piece corresponding to one of the light sources and one of the supporting plates;
each of the light guide plate pieces comprising:
a light incident section comprising:

a light incident surface configured to receive light beams emitted from a light source;
a top surface adjacent to the light incident surface; and
a first bottom surface opposite to the top surface;
a light guiding section comprising:
a main light emitting surface;
a connecting surface connecting the main light emitting surface with the top surface of the light incident section;
a second bottom surface opposite to the main light emitting surface and connected with the first bottom surface of the light incident section; and
a contacting surface connecting the main light emitting surface of the light guide section with the second bottom surface thereof;
wherein the first bottom surface is perpendicular to the light incident surface, the first bottom surface and the second bottom surface are flat, the second bottom surface and the first bottom surface are not in a same plane, and an angle defined between the first bottom surface and the second bottom surface is an obtuse angle; and
wherein a step is formed at a junction of the light incident section and the light guiding section, and the connecting surface of the light guiding section and the top surface of the light incident section define an accommodating space to receive a neighboring light guide plate piece.

* * * * *